C. W. HODGES.
ANTISKID CHAIN.
APPLICATION FILED MAR. 2, 1917.
1,284,338.
Patented Nov. 12, 1918.
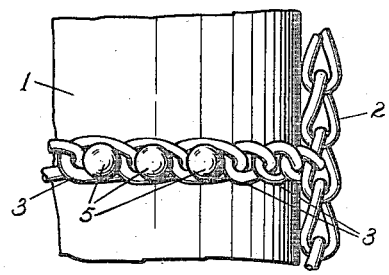
Fig. I.
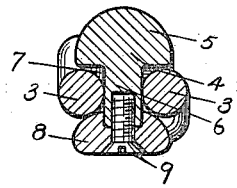
Fig. III.
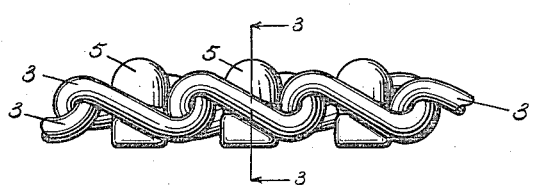
Fig. II.
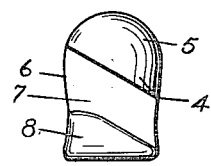
Fig. IV.
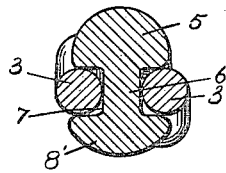
Fig. V.
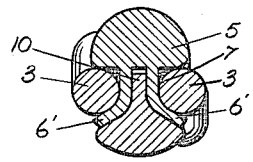
Fig. VI.
WITNESSES:
Levy Gilman
Luther Blake
INVENTOR.
CHAUNCEY W. HODGES
BY Chappell & Earl
ATTORNEYS.

UNITED STATES PATENT OFFICE.

CHAUNCEY W. HODGES, OF GRAND RAPIDS, MICHIGAN.

ANTISKID-CHAIN.

1,284,338.  Specification of Letters Patent.  Patented Nov. 12, 1918.

Application filed March 2, 1917. Serial No. 152,002.

*To all whom it may concern:*

Be it known that I, CHAUNCEY W. HODGES, a citizen of the United States, residing at the city of Grand Rapids, in the county of Kent and State of Michigan, have invented certain new and useful Improvements in Antiskid-Chains, of which the following is a specification.

This invention relates to improvements in anti-skid chains.

The object of the invention is to provide the flexible cross members of an anti-skid chain of the ordinary twisted link type with tread members which will relieve the links of the cross members of a considerable portion of the wear to which they would otherwise be subjected. A further object of this invention is to provide tread members of the kind described which may be readily attached to or detached from the cross members.

Further objects, and objects relating to structural details will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing, forming a part of this specification, in which:

Figure I is a plan view of a portion of a tire with my improved anti-skid device in place thereon, portions of the tire and the anti-skid device being broken away.

Fig. II is an enlarged side elevation of a portion of one of the cross members.

Fig. III is an enlarged detail section taken on a line corresponding to line 3—3 of Fig. II.

Fig. IV is a side elevation of one of the tread members.

Fig. V is an enlarged detail section of a modified form of my invention taken on a line corresponding to line 3—3 of Fig. II.

Fig. VI is an enlarged detail section of a further modification of my invention taken on a line corresponding to line 3—3 of Fig. II.

In the drawing similar reference characters refer to similar parts throughout the several views, and the sectional views are taken looking in the direction of the little arrows at the ends of the section lines.

Referring to the drawing, the reference character 1 indicates a portion of a tire and 2 one of the side members of a tire chain and 3 a cross or tread member thereof. The tread or cross member 3 is made of a piece of chain of the ordinary twisted link variety, the opposite sides of which are inclined in opposite directions.

In the preferred embodiment of my invention the tread member 4 comprises a head 5, a shank 6 formed by the oppositely inclined grooves 7, and a retaining member 8, the bottom side of which is adapted to contact with the outer side of the tire.

In the embodiment of Figs. I, II and III the retaining member 8 is secured to the shank 6 by means of the longitudinally disposed screw 9.

In the embodiment disclosed in Fig. V the tread member is forged onto the links of the cross chain, the retaining lead or member 8' being made integral with the shank 6. In this form the bottom of the retaining member is curved in cross section, as shown in Fig. V.

In the embodiment disclosed in Fig. VI the shank is slotted to form two spaced flanges 6' and the retaining member is provided with a central flange 10 which fits between the flanges 6'. The flanges 6' are spread outwardly at their bottom ends to conform to the curvature of the retaining member and are spot-welded thereto.

Having thus described my invention, what I claim as new and desire to secure by Letters Patent is:

In a structure of the class described, the combination with an anti-skid structure comprising cross members formed of twisted links, of stud members received between the oppositely inclined sides of each link comprising a head, a shank, and a retaining member secured to said shank and forming with the head member oppositely inclined grooves which coöperate with the oppositely inclined sides of said links, substantially as described.

In witness whereof, I have hereunto set my hand and seal in the presence of two witnesses.

CHAUNCEY W. HODGES. [L. S.]

Witnesses:
B. F. BARENDSEN,
JESSE H. ECKERT.